US010843348B1

(12) United States Patent
Aduh et al.

(10) Patent No.: US 10,843,348 B1
(45) Date of Patent: Nov. 24, 2020

(54) ACTUATOR AND GRIPPER ASSEMBLY

(71) Applicant: Amazon Technologies, Inc., Seattle, WA (US)

(72) Inventors: Erica Aduh, Cambridge, MA (US); Gregory Coleman, Somerville, MA (US); Leonard Thomas Lilliston, III, Roxbury, MA (US); Andrew Marchese, Acton, MA (US); Beth Marcus, North Reading, MA (US); Manikantan Nambi, Melrose, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/219,601

(22) Filed: Dec. 13, 2018

(51) Int. Cl.
*B25J 15/00* (2006.01)
*B25J 15/06* (2006.01)

(52) U.S. Cl.
CPC ....... *B25J 15/0683* (2013.01); *B25J 15/0023* (2013.01)

(58) Field of Classification Search
CPC ............... B25J 15/0023; B25J 15/0616; B25J 15/0683; B25J 15/0691; B25J 15/12; B25J 9/142
USPC ................. 294/185, 189, 99.1, 86.4, 119.3
See application file for complete search history.

(56) References Cited

U.S. PATENT DOCUMENTS

| | | | | |
|---|---|---|---|---|
| 3,343,864 A * | 9/1967 | Baer | ................... | B25J 15/0023 294/119.3 |
| 3,386,763 A * | 6/1968 | Ottaway | ................ | B65H 3/22 294/61 |
| 3,913,307 A * | 10/1975 | Cardinal, Jr. | ........ | A01D 46/005 56/328.1 |
| 3,981,528 A * | 9/1976 | Andorf | ............... | B25J 15/0023 294/119.3 |
| 5,568,957 A * | 10/1996 | Haugs | ...................... | B25J 15/12 294/119.3 |
| 6,484,601 B1 * | 11/2002 | Arrichiello | ............... | B25J 9/14 294/106 |
| 7,258,379 B2 * | 8/2007 | Ono | ........................ | B25J 9/142 294/119.3 |
| 9,687,362 B2 * | 6/2017 | Mosadegh | ................ | A61F 2/68 |
| 9,981,377 B2 * | 5/2018 | Morin | .................... | B25J 9/1075 |
| 2003/0110938 A1 * | 6/2003 | Seto | ......................... | B25J 9/142 92/92 |
| 2017/0036355 A1 * | 2/2017 | Lessing | .................. | B25J 15/12 |

\* cited by examiner

*Primary Examiner* — Dean J Kramer
(74) *Attorney, Agent, or Firm* — BakerHostetler

(57) ABSTRACT

An actuator for a suction-cup end effector bends or deforms in response to air pressure within bladders in the actuator. Air bladders of the actuator apply bending moments to rigid flange structures, which transmit the moments to a base layer of the actuator. Grasping elements may be used.

20 Claims, 12 Drawing Sheets

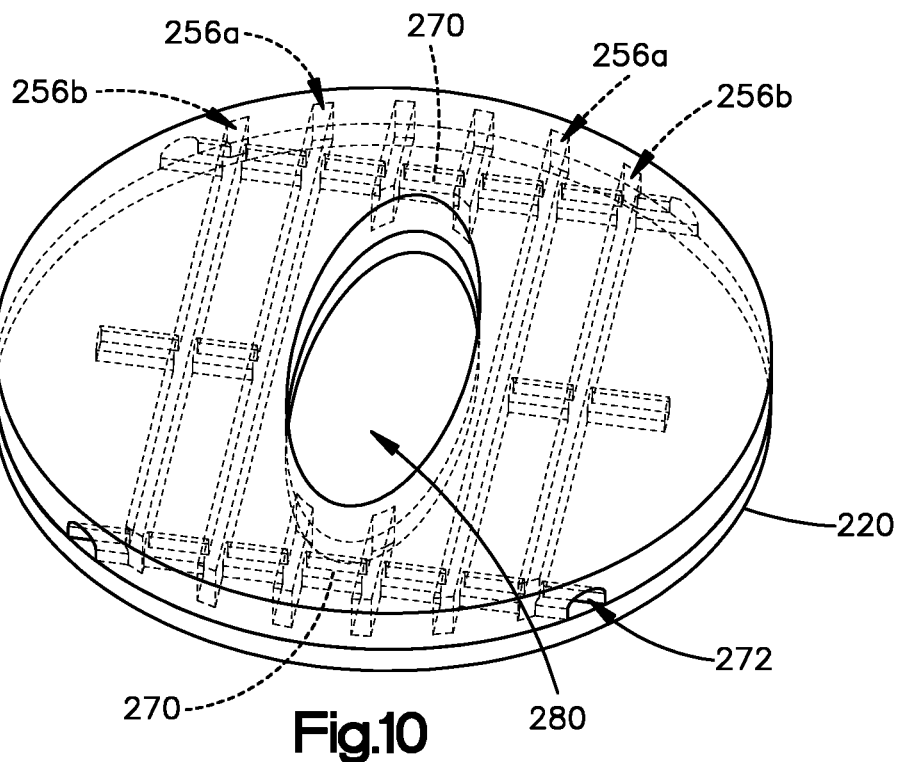
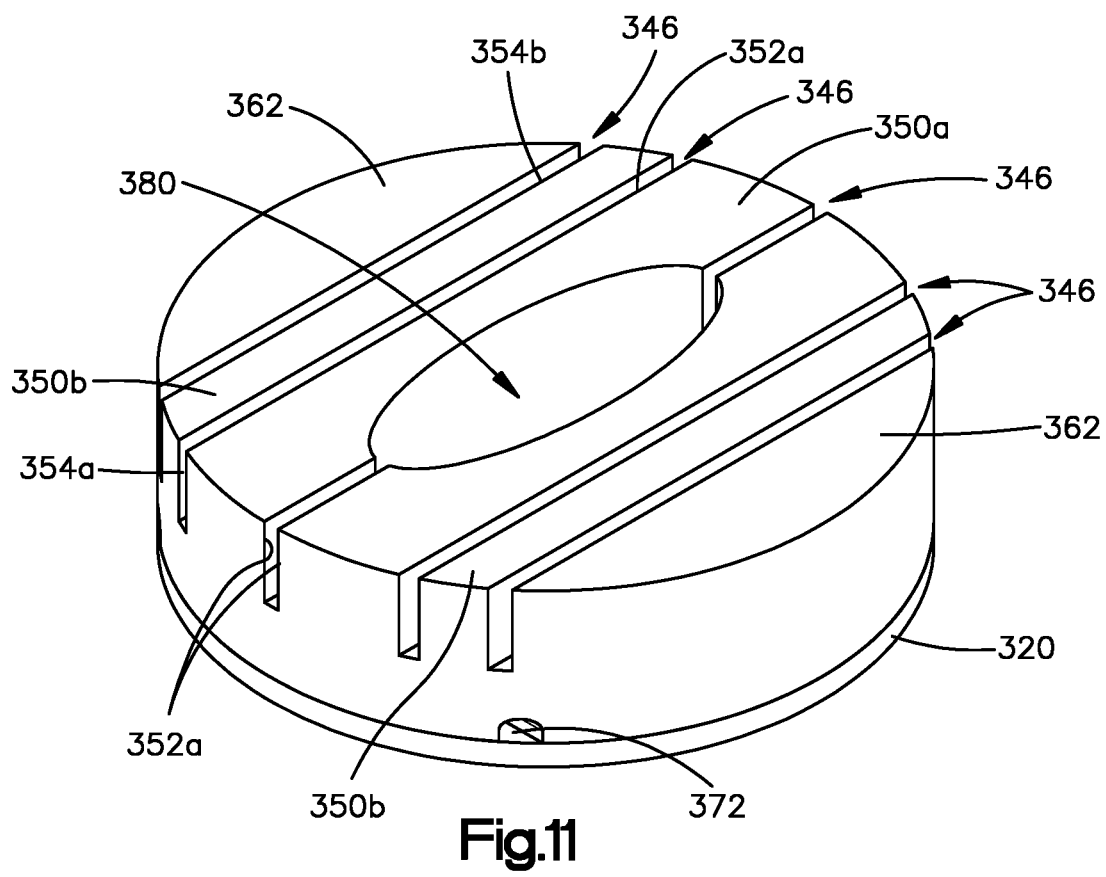

ACTUATOR AND GRIPPER ASSEMBLY

BACKGROUND

The present disclosure relates to robotics, and more particularly actuators for end effectors.

In general, end effectors used in automated processes are categorized into impactive, which often use jaws or claws that contact and grasp an object; ingressive, which includes pins or the like to penetrate the surface of an object; astrictive, which work by vacuum or magneto-adhesion or the like; and contigutive, which work by an adhesion process, such as gluing or surface tension.

In commercial warehouses, such as fulfillment centers and like facilities, automated processes often employ impactive and astrictive end effectors to handle a vast variation in the shape, size, and mass of objects, as well as to handle randomly oriented objects. An example of a modern air-actuated end of arm tool is an air-actuated finger assembly in which each curved finger has upstanding air chambers. When the air chambers are pressurized, the curvature of the finger decreases, which causes the fingers to move relatively inwardly to grasp an object

BRIEF DESCRIPTION OF DRAWINGS

FIG. 10 is a horizontal cross-sectional view of the actuator of FIG. 8;

FIG. 11 is a top perspective view of a third embodiment soft actuator shown in the rest position and illustrating aspects of the present invention;

DETAILED DESCRIPTION

Figure 17:
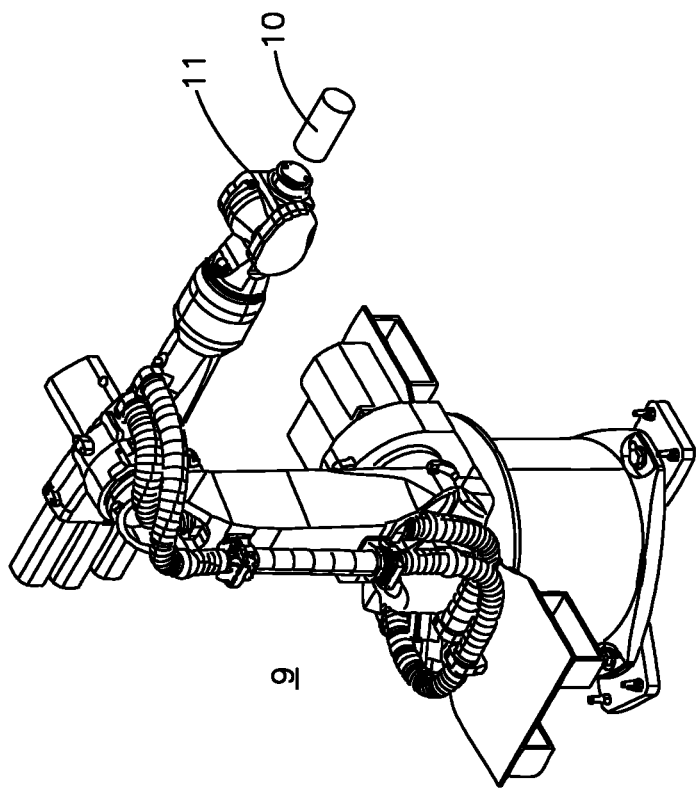
FIG. 17 is an illustration of a robot that can employ the components of the present invention.

A robot, such as a gantry or a six axis robot 9 illustrated in FIG. 17, includes an end effector 10 that is capable of grasping an object, and at least in some cases the end effector at least partially adapts or conforms (in shape) to the object to enhance gripping. A gripper can include an actuator that deforms or bends in response to air pressure within adjacent air bladders. Optionally, a grasping element, such as a suction cup assembly may be employed that includes a pliable suction cup body having a distal end adapted for contacting the object and a proximal face or end.

According to one embodiment, end effector 10 can includes an actuator 510 that can include a flexible base layer having a rest or neutral position and an actuated position; a pair of opposing flange structures; and a compliant air bladder assembly. Each flange structure can include an elongate flange wall and a flange plate rigidly attached to the flange wall. The air bladder assembly can include elongate air bladders located above the base layer and may be between the opposing flange walls. The air bladder assembly can be configured to expand, upon pressurization, to apply opposing moments to the flange structure, thereby deforming the base layer toward the actuated position.

The actuator can be used with a resilient suction cup or other gasping element or alone (that is, without a grasping element attached as an interface with an item) as the gripper itself.

The outwardly oriented forces created by the expansion of the air bladders can be applied to the flange walls. The flange plate can extend over the base layer such that the moment applied from the air bladders to the flange wall is transmitted to the base layer via the flange plate. The base layer includes an air bladder region and a pair of ears extending outwardly from the bladder region. The flange plate can be unattached to the ears of the base layer in a region spaced apart from the flange wall. The flange wall can be angled relative to the flange plate, such as orthogonal to create a L-shaped-linkage configuration in which the force applied to one arm (that is, the flange wall) of the linkage transmits a moment via the other arm (that is, the flange plate).

According to another aspect, the actuator can form a gripper for grasping an item. The gripper includes a grasping element, such as a foam suction cup, non-slip surface, and/or other grasping elements, such as one of a non-slip surface, ingressive elements, magnetic elements, and adhesive elements adapted for grasping the item. Further, an underside surface of the base layer of the actuator can form the grasping element. Each one of the actuator and the grasping element include a center aperture through which a fitting can extend to join the gripper to an end of arm tool.

A method of grasping an item using a gripper can include positioning the gripper relative to an item, pressurizing air bladders of the actuator such that the air bladders apply bending moments to the flange structures; deforming the grasping element in response bending moments transmitted through the flange structures; and grasping the item via engagement of the grasping element with the item.

The deforming step, where a suction cup is included as the grasping element, can include deforming the suction cup and the grasping step includes applying vacuum to an interior of the suction cup. After grasping, the item can be lifted and then released by releasing the air pressure in the air bladders. In some suction cup configurations, releasing the air pressure enables the actuator to resiliently return to the neutral position and enables the suction cup assembly to resiliently return to the neutral position independently from the resilient return of the actuator to the neutral position.

The soft actuator includes a constraining layer having a rest position and an actuated position, and a complaint air bladder assembly including elongate air bladders located above the constraining layer. Each air bladder, upon pressurization, is configured to expand to contact a wall of the air bladder assembly for moving the constraining layer from the rest position toward the actuated position, which may be arcuate (that is, when viewed from the side) or substantially flat. At least one of the constraining layer and the air bladder assembly is resiliently adapted for moving the constraining layer form the actuated position release of air pressure from the air bladders. In this regard, the actuator returns to its rest position, such as the constraining layer being planar, upon release of air pressure from the air bladders. Perfect flatness is not required for the surface to be planar, as used herein.

In an embodiment, the constraining layer, in the rest position, has the shape for a circular disk, and the air bladders are oriented along chords of a circle defined by the disk. The constraining layer lower surface may include a surface or cover suitable for contacting the suction cup assembly.

The air bladders can be connected by a common plenum that can be formed between the constraining layer and the air bladder structures and connected to a compressed air inlet. The air bladders can be formed by an air chamber between opposing elongate walls that are adapted for outward expansion (such as bulging) upon pressurization. The inboard wall of each air bladder can be configured and positioned relative to adjacent air bladders such that, upon outward deflection, the air bladder contacts the expanded wall of an adjacent air bladder. In this regard, the expanded (bulged) outboard wall contacts the expanded (bulged) inboard wall of an adjacent air bladder. Or the expanded air bladder wall can contact another surface, such as an unexpandable wall, the structure of an attachment fitting, or the like.

The air bladder elongate walls may be mutually parallel in the rest position and include a cap at an upper end of the walls of the air bladder for sealing the upper end of the air chamber such that each air bladder forms an inverted U-shape in the rest position. The air bladders are oriented along chords of a circle defined by the disk. Thus, the air bladders can be separated by chordal slots (when the actuator is circular). The air bladder assembly can be formed of a unitary material, preferably a hyper-elastic material or elastomeric material, and that is itself adhered to the constraining layer, which may also be formed of the elastomer. An intermediate structure (not shown) of any type can be between the constraining layer and the air bladder, consistent with the function explained herein.

A robotic end of arm tool gripper can employ the soft actuator. The soft actuator can work with many gripper components, such as a suction cup assembly that defines an aperature through which a vacuum may be applied. The suction cup assembly, which may have a ring-like shape, is configured to be at least initially moved from a rest position by movement of the actuator. The suction cup assembly in this illustrative embodiment can conform to and grasp an object upon application of vacuum to the suction cup assembly. The constraining layer may include a contact surface adapted for contacting an upper surface of the suction cup assembly.

In some cases, the constraining layer is not affixed to the suction cup assembly, and the suction cup assembly is adapted to resiliently return to its rest position upon release of the vacuum to the suction cup assembly independent of the resilience of the actuator. In an specific example, the suction cup assembly comprises a flat, resilient ring; a foam cup attached to the ring; and a planar, flexible membrane attached to the ring and extending radially inwardly from the ring. The suction cup assembly is configured to resiliently return to its rest state upon disengagement with the object. The flat, resilient ring may bias the foam cup of the suction cup assembly toward the rest position. Alternatively, the foam cup of the suction cup may be biased in other positions, such as a concave/actuated or convex/retracted position. For example, in a retracted position may enable a smaller contact area of the suction cup. Each one of the soft actuator and the suction cup assembly may include a center aperture through which a fitting can extend to join the gripper to an end of arm tool. Perfect flatness is not required for the surface to be planar, as used herein.

A method of grasping an object can use the actuator and the suction cup assembly (or other structure that can benefit from the action of the bending of the actuator). The method can include positioning the gripper relative to an object while each one of the soft actuator and the suction cup assembly are in a rest position; pressurizing air bladders of the actuator such that the actuator constraining layer bends to contact an upper surface of the suction cup assembly, thereby promoting bending of the suction cup assembly; and applying vacuum to an interior of the suction cup assembly such that the suction cup assembly conforms to and grasps the object by vacuum. In this regard, the constraining layer restricts radial, planar deformation (that is, increase in diameter) such that the bending moment applied by the air bladder forces, such as against adjacent air bladders or adjacent walls, bends the constraining layer according to a predetermined profile. The radial constraining function can be achieved by the structure of the constraining layer, and/or may be formed by a material that is less extensible that that of the air bladder material.

Then, the method can include lifting the object after the step of pressurizing the air bladders and applying vacuum to the suction cup or like gripper; and releasing the pressure in the air bladders and releasing vacuum in the suction cup assembly, thereby (i) releasing the object and (ii) enabling the actuator to resiliently return to the rest position and enabling the suction cup assembly to resiliently return to the rest position independently from the resilient return of the actuator to the rest position.

Referring to FIG. 17, a robotic gripper 10 is mounted to an arm 11 of a robot 9. Other means for positioning robotic gripper 10 are contemplated, and the invention is not limited to any particular positioning means unless specified in the claims. A pressurized air source and a vacuum source (not shown in the figures) are supplied to gripper 10.

Gripper 10 includes a soft actuator 110 that includes a lower constraining layer 120 and an air bladder assembly 140. In the embodiment shown in the FIG. 2 through FIG. 6 for a first embodiment actuator 110, constraining layer 120 in its rest position is a circular disk that has a planar underside surface 122. Air bladder assembly 140 preferably is adhered to constraining layer 120 such that constraining layer 120 and the air bladder assembly 140 are an integral unit. Underside surface 122 may have layer, such as a Cordura Nylon, to enhance friction and/or resist deformation.

Air bladder assembly 140 includes air bladders 150. Reference number 150 is used to refer to the air bladders or any one of the air bladder generally, and an appended letter, such as air bladder 150a or 150b, is used to refer to a particular one of the air bladders.

Figure 1:
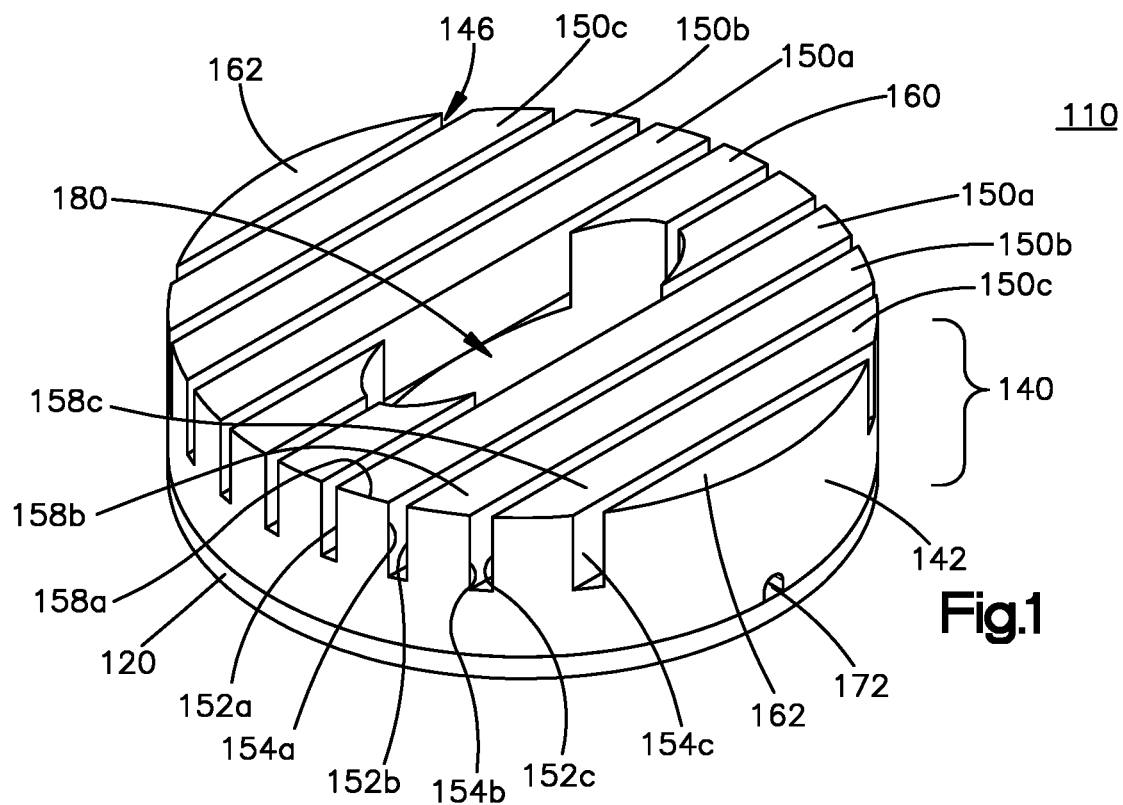
FIG. 1 is a top perspective view of a first embodiment soft actuator shown in the rest position and illustrating aspects of the present invention.
Figure 2:
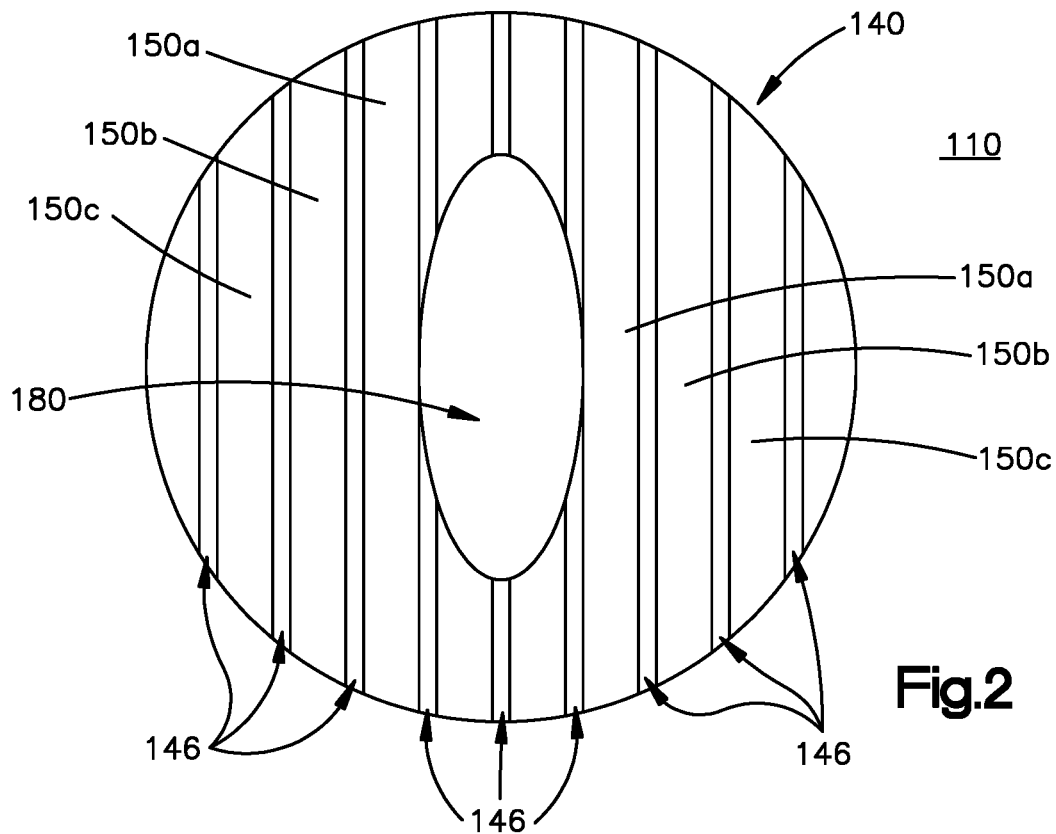
FIG. 2 is a top view of the first embodiment actuator.
Figure 3A:
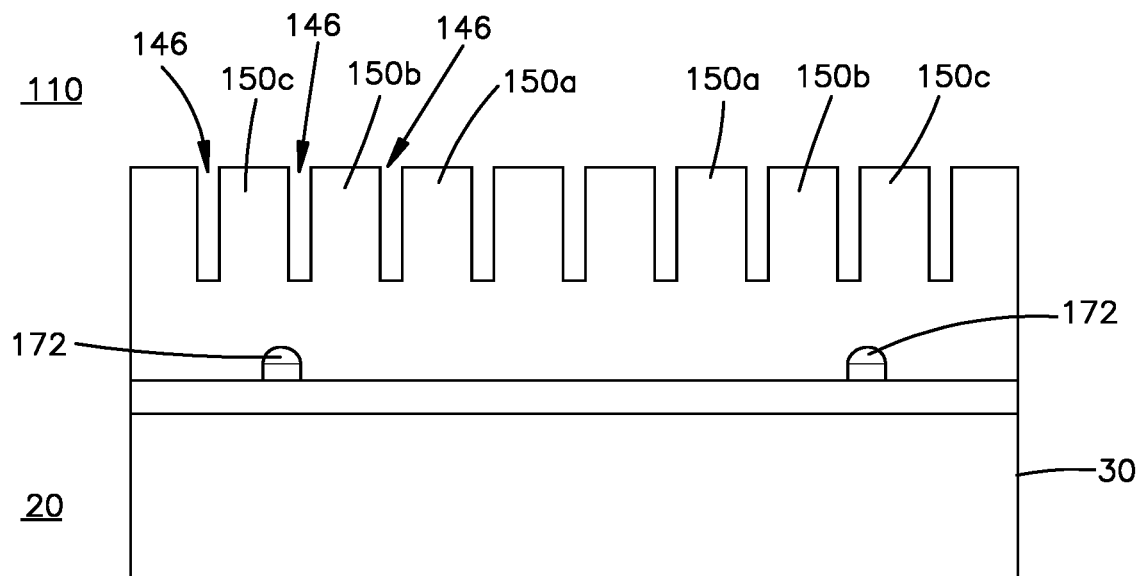
FIG. 3A is an enlarged view of the actuator of FIG. 1 together with a suction cup, illustrated in the at rest, un-actuated position.
Figure 3B:
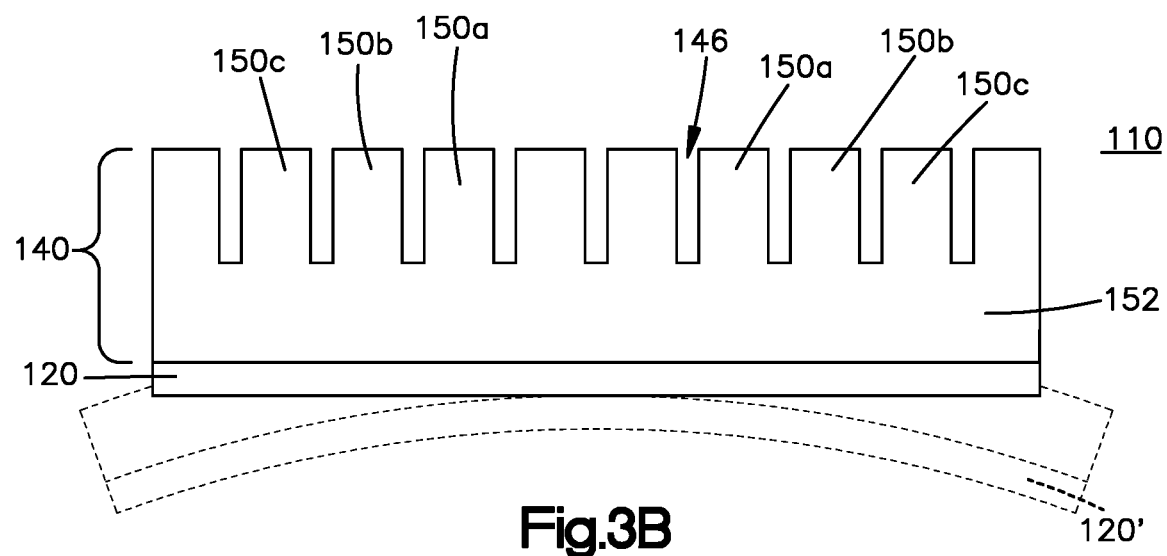
FIG. 3B is a side view of the actuator of FIG. 1, with a schematic illustration of the actuator in an actuated position.
Figure 4:
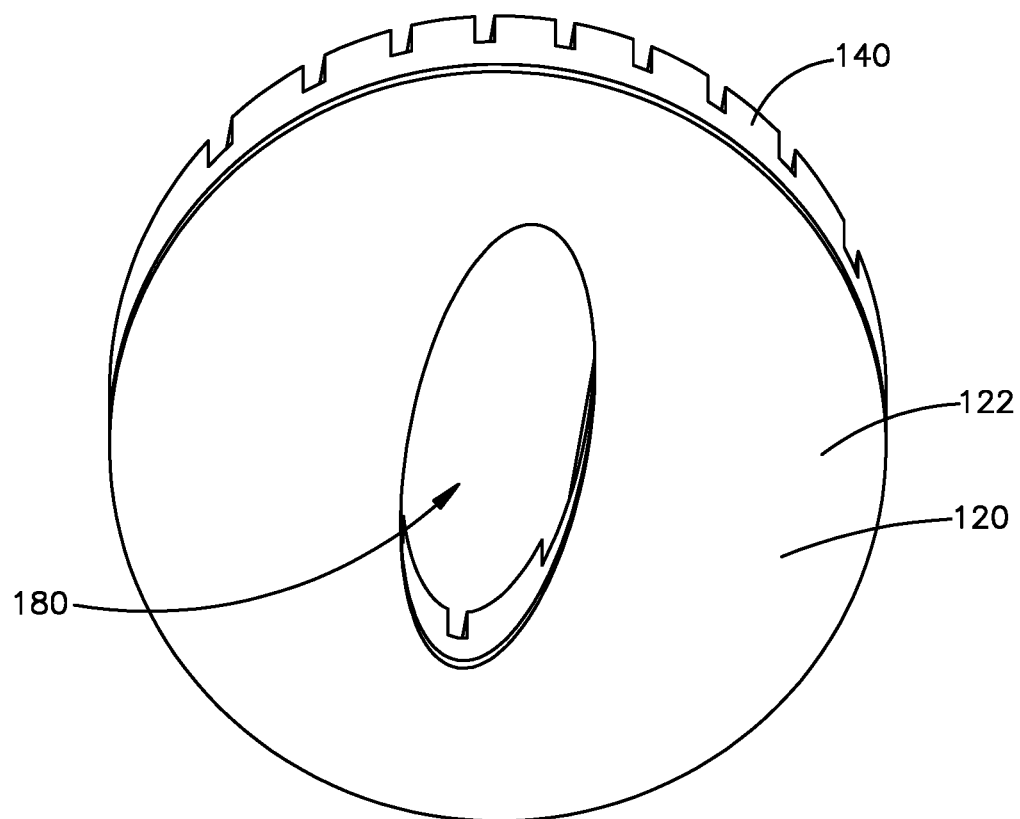
FIG. 4 is a bottom perspective view of the actuator of FIG. 1.
Figure 5:
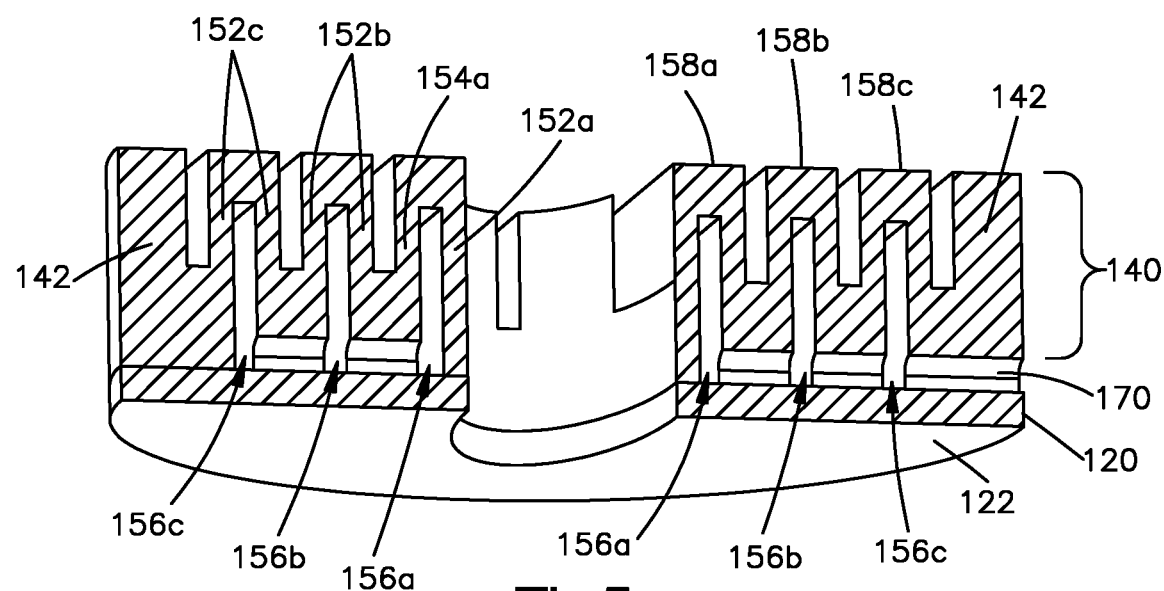
FIG. 5 is a transverse cross-sectional view of the actuator of FIG. 1.

Air bladders 150 are upstanding relative to constraining layer 120 and separated by slots 146 that have the geometric shape of a 3D projection of chords drawn on a circle defined by constraining layer 120. Thus, the air bladders in the embodiment of FIG. 2 are parallel and chordal. In the figures, the slots are vertical when the actuator is in the rest position. Other orientations of the slots, such as inclined from vertical and not mutually parallel, are contemplated.

As illustrated in the figure, the air bladders in the figures are symmetrical about a centerline that is parallel with the air bladders and parallel with slots through the center of actuator 110. As best illustrated in the cross-sectional views, each air bladder 150 is formed by opposing, upstanding walls, including an inboard wall 152 and an outboard wall 154, that define an air chamber 156 between the walls. Each air chamber 156 is a space that is connected by one or more plenums 170 to others of the air chambers 156 and that lead to a compressed air inlet 172. Thus, only one or two air inlets are required to pressure all the air bladders. The top of each air bladder is covered by a cap 158 that extends between walls 152 and 154, thus sealing the air chamber 156.

In the embodiment of FIG. 2 through FIG. 6, actuator 110 has an elongated aperture 180 at the center that extends through air bladder assembly 140 and constraining layer 120. Air bladders 150 are outboard of aperture 180 on each long side of the aperture. A first air bladder 150a on each side of aperture 180 includes inboard and outboard walls 152a and 154a, second air bladders 150b have inboard and outboard walls 152b and 154b, and third air bladders 150c have inboard and outboard walls 152c and 154c. Air chambers 156a, 156b, and 156c are defined in the respective air bladders between the respective walls.

Figure 6:
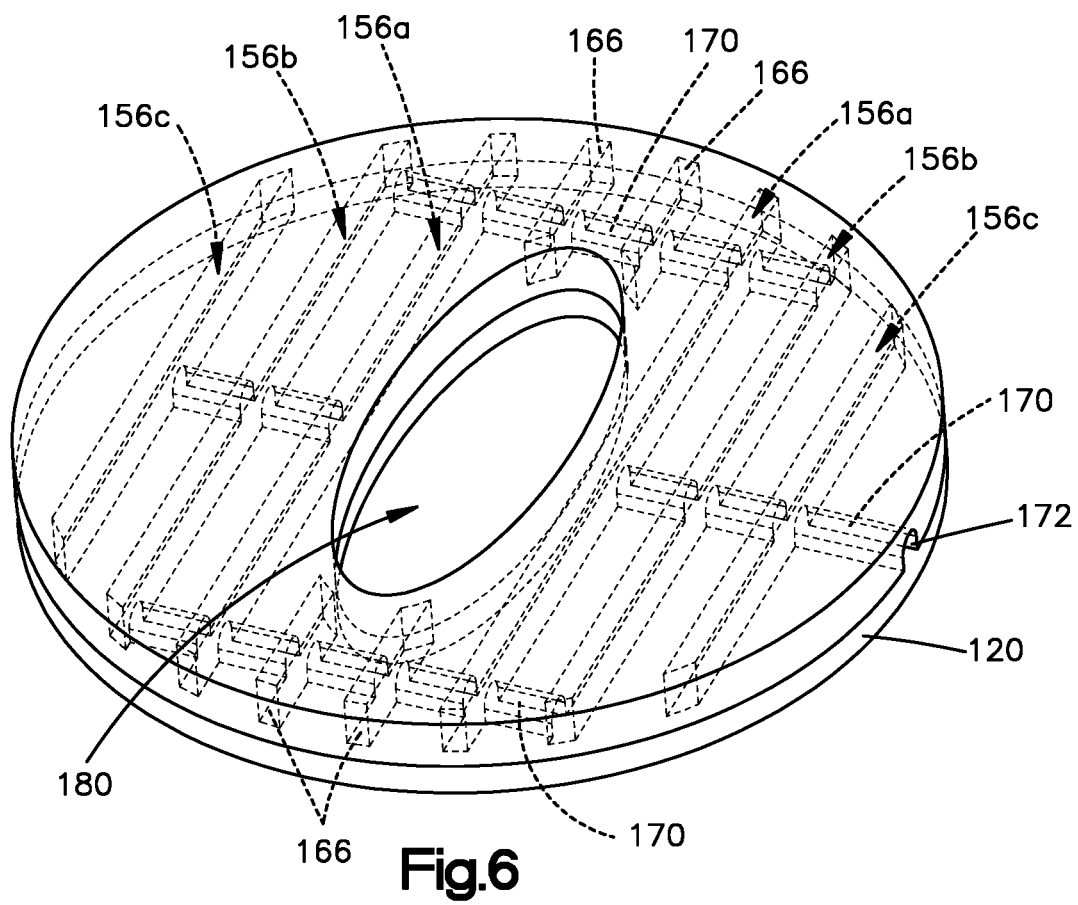
FIG. 6 is a horizontal cross-sectional view of the actuator of FIG. 1.

The partial chordal portions 160 on opposing ends of aperture 180 and inboard of first air bladders 150a may include air bladders 166 (as illustrated in FIG. 6) including air chambers and function as explained with respect to air bladders 150 (described below). The effect bulges of the inboard walls of chordal portions 160 is to have an outwardly directed force the created a moment at the bending axis of constraining layer 120.

Outermost portions 162 (that is, outboard of the outboardmost chordal groove 146) may be an elastomer or solid hyper-elastic material as illustrated in FIG. 6, or alternatively portions 160 can include an air chamber and function as described for air bladder 150 (not shown in the figures).

Plenum 170 can take any structure that communicates pressurized air among the air bladders from one or more air inlets 172.

Figure 7:
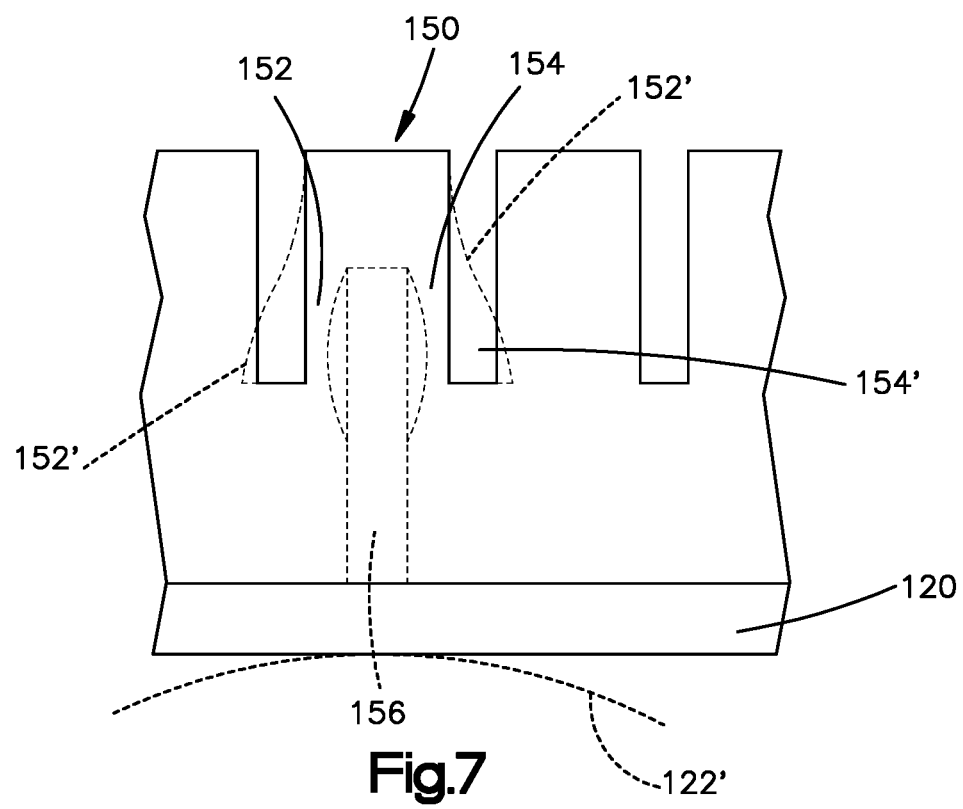
FIG. 7 is an enlarged portion of the air bladder assembly and constraining layer of the actuator of FIG. 1, schematically illustrating operation of an air bladder.

FIG. 7 is a schematic illustration of the function of actuator 110. Upon pressurization of the air chamber of an exemplary air bladder 150, inboard wall 152 and outboard wall 154 expand outwardly to form an inboard bulge 152' and an outboard bulge 154', respectively. As illustrated, bulges 152' and 154' expand the face of the walls to the extent that each bulge contacts and presses against the adjacent walls, and creates an outward force on the adjacent wall. FIG. 7 schematically illustrates the magnitude of the bulges 152' and 154' by dotted lines.

The force created by the bulges against the adjacent walls create a bending moment in constraining layer 120 that tends to bend or deflect the actuator, as schematically illustrated by the dashed line 122', which represents constraining layer underside surface 122 upon deflection by the expanded air bladder 150. The magnitude of bending is greater if the wall adjacent to wall 152' and the wall adjacent to wall 154' each are walls of an air bladder, which expanded wall is illustrated on the right side of air bladder 150 by a dot-dash-dot line. For example, in FIGS. 2 through 6, air bladder 150b is between air bladders 150a and 150c. Upon pressurization, inboard air bladder wall 152b would expand to form a bulge and contact the bulge of adjacent outboard wall 154a. And outboard air bladder wall 150b upon bulging would contact the bulge of expanded inboard wall 152c. The effect is to apply a force, and thus a bending moment on the constraining layer, at each contact point. FIG. 6 illustrates the effect of the forces by showing a schematic representation of constraining layer 120 in its actuated state as reference number 120'. The shape of constraining layer 120' can have any curvature or combination of curvatures and/or straight portions, which shapes are referred to herein as arcuate.

To form actuator 110, air bladder assembly 140 can be molded or formed by other method of a pliable and resilient material, such as a hyper-elastic material. Other, elastomeric materials such as latex, rubber, and silicone may be used. Other materials are contemplated. Constraining layer 120 may be formed of the same or other material as that of the bladder assembly 140. The two parts can be joined together by an adhesive or other known means for joining the particular materials chosen.

The choice of material, shape of the constraining layer 120, shape and dimensions of the air bladder assembly overall, dimensions and locations of the air chamber, dimension and locations of the walls opposing the air bladder, and other parameters may be chosen together in order to achieve the desired functional properties of the air bladder, such as magnitude of deflection, location of bending axis, shape of constraining layer upon deflection, and the like, upon pressurization.

The actuator is described herein as having a circular shape, especially at surface 122 of constraining layer 120. The present invention is not limited to actuators having any shape. For example, an actuator having a square, rectangular, oval, or polygonal shape may be employed, as required by the particular objects of the application. Further, the air bladders are described as elongate and are shown in the figures to be straight. The present invention is not limited to straight air bladders or elongate air bladders unless specified in the claims. Further, the air bladders are illustrated as having a rectilinear cross-sectional shape. The actuator is not limited to the rectilinear air bladder configuration, but rather encompasses of air bladders having any shape, such as triangles, inverted triangles, arcuate curves and like cross-sectional shapes.

For example, the following parameters may be chosen to yield the desired shape of the actuator (such as the constraining layer underside surface and the force and/or bending moment imparted by the actuator, and other desired attributes of the actuator) in the actuated position: the number and location of the air bladders, wall thickness of the opposing walls of the air bladders, dimension of the slots (that is, between adjacent walls), whether air bladders are side-by-side or separated by non-expanding solid portions, modulus of elasticity of the material, moment of inertia of the structure or other mechanical property associated with resistance to deformation, air pressure, thickness of the constraining layer, and other parameters that will be understood by persons familiar with air actuated grippers in view of the present disclosure.

Figure 8:
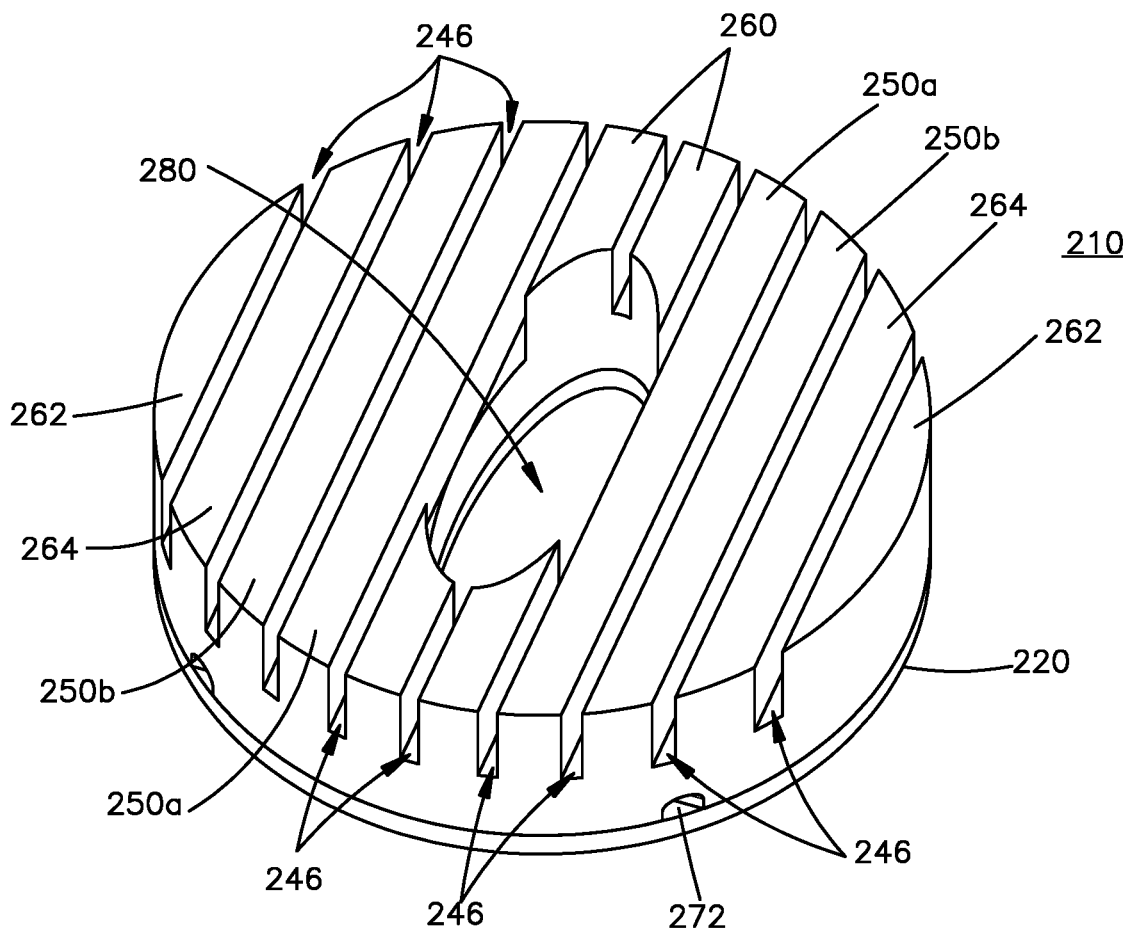
FIG. 8 is a top perspective view of a second embodiment soft actuator shown in the rest position and illustrating aspects of the present invention.
Figure 9:
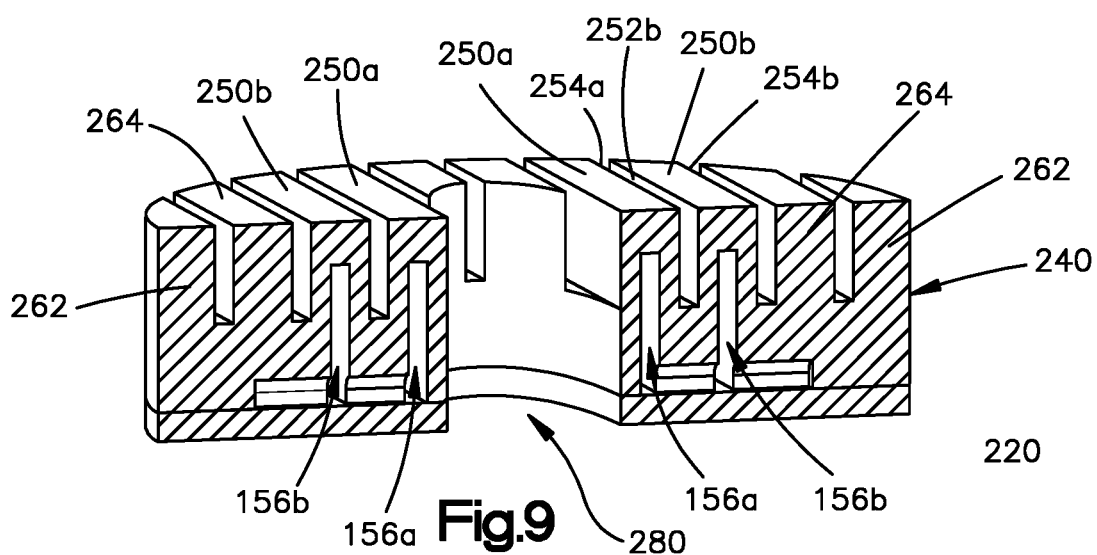
FIG. 9 is a transverse cross-sectional view of the actuator of FIG. 8.

Referring to FIG. 8 through 10 to illustrate a second embodiment air bladder assembly, which includes air bladders 250. Reference number 250 is used to refer to the air bladders generally or as a whole, and an appended letter, such as air bladder 250a or 250b, is used to refer to a particular one of the air bladders.

Air bladders 250a and 250b have the structure and be formed of the same materials as described for first embodiment air bladders 150a and 150b, extending on opposing sides of an aperture 280, and portions 260 can have the same structure of first embodiment portion 160, which as described above can include air chambers that form a bulge in the corresponding air bladder wall. Aperture 280 can have the same structure as first embodiment aperture 180. The air bladders of second embodiment 210 can function the same way as described for the air bladders of first embodiment 110.

Second embodiment air bladder assembly includes an upstanding portion 262 that is outboard of the outboard-most chordal groove 246. The upstanding portion 262 does not include an air chamber and thus does not function as an air bladder, which is distinguished from the first embodiment 100, as the upstanding portion 262 is located in the place corresponding to the location of air bladder 150c in first embodiment actuator 110. Plenums 270 and constraining layer 220 may be as described for the corresponding structure of first embodiment actuator 160.

Solid (not expanding) portion 262 has an inboard solid wall that does not contain an air chamber and therefore does to expand or have bulges. Thus, the force applied between the expanded bulges from the outboard wall of air bladder 250b is reduced (or optionally eliminated) compared with a pair of air bladders, such as between the outboard wall 254b of air bladder 250b and inboard wall 252c of air bladder 250c. In this regard, constraining layer 220 may have less curvature (that is, a larger radius of curvature) at the distal ends of actuator 210 (that is, along axis perpendicular to a line bisecting aperture 280 longitudinally, and therefore bisecting outermost portion 260) than that of first embodiment 210. In some configurations, forgoing an air bladder in the outermost portion (such as solid portion 262) prevents the outermost tips of the actuator from going past vertical to restrict the opening in the actuator. In addition to the quantity and number of air bladders, other parameters may be chosen of affect the magnitude and shape of the bend of the constraining layer in the actuated position, as described above.

Figure 12:
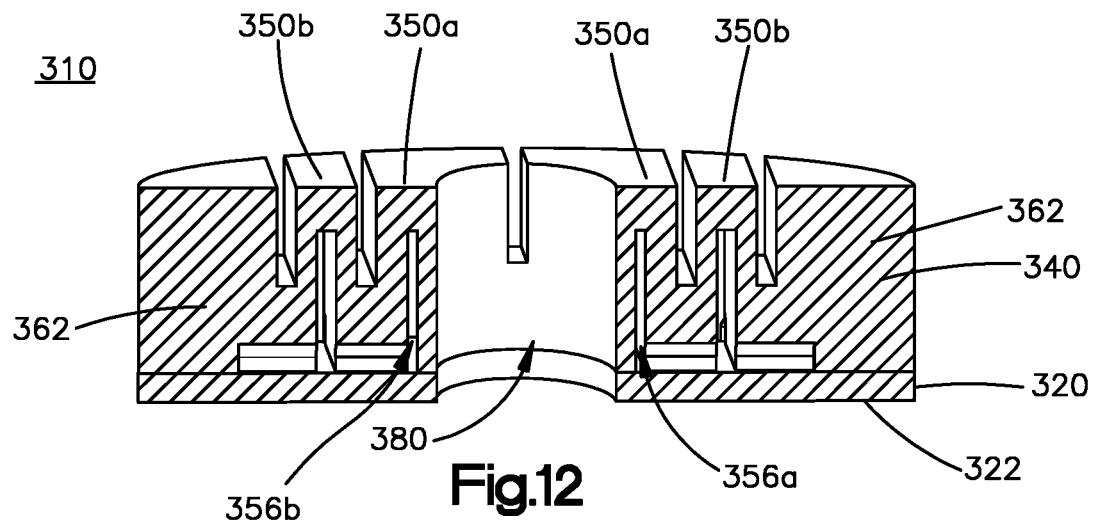
FIG. 12 is a transverse cross-sectional view of the actuator of FIG. 11.
Figure 13:
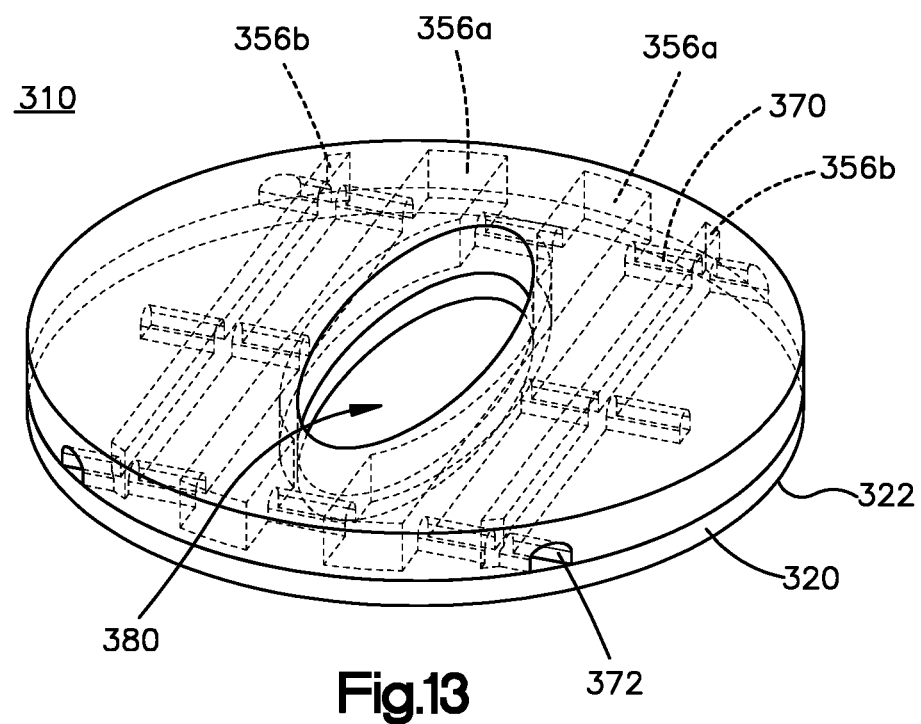
FIG. 13 is a horizontal cross-sectional view of the actuator of FIG. 11.

Referring to FIG. 11 through 13, a third embodiment air bladder assembly includes a constraining layer 320 and air bladder assembly 340, which includes air bladders 350a and 350b. Air bladders 350a include an air bladder portion that is adjacent the long side of an aperture 380 and that extends around aperture 380 past the ends of the aperture. In this regard, air bladder 350a can (conceptually and generally) be considered to be a combination of the air bladders 150a and 166 of the first embodiment.

Aperture 380 can have the same structure as first embodiment aperture 180. Air bladders of third embodiment 310, to the extent of the bulges impinge on the adjacent wall, can be as described for first embodiment 110. Air bladder assembly 340 includes an upstanding portion 362 that is as described for second embodiment portions 262. Plenums 370 and constraining layer 320 may be as described for the corresponding structure of first embodiment actuator 160.

Upon actuation, force is applied by the interaction of the expanded bulges from the inboard walls 352a of the partial chordal portions if air bladders 350a, between bulges of first air bladder 350a outboard wall 354a and second air bladder 350b inboard wall 352b, and between second air bladder 350b outboard wall 352b and the inboard wall of upstanding portion 362. Thus, the quantity of air bladders in actuator 310 is fewer than the quantity of air bladders in first actuator 110 with corresponding changes to the profile upon pressurization and actuation. In addition to the quantity and number of air bladders, other parameters may be chosen to affect the magnitude and shape of the bend of the constraining layer in the actuated position, as described above.

As an example of the kind of suction cup assembly that may be employed with the soft actuator, a pliable sealing bellow or sealing membrane is coupled to the ring and extends radially inwardly from the structural ring. A connector, which preferably is at the center of the suction cup in embodiments in which the suction cup is symmetrical, can be configured to attach to a vacuum port.

The suction cup assembly has a rest or unactuated state or position and an engaged or deformed state or position. In its rest position, the suction cup is in its conventional, flat position in which the contact surface of the suction cup is planar. Perfect flatness is not required for the surface to be planar, as used herein. Upon application of vacuum (preferably), or optionally upon actuation by actuators, such as linear actuators, the suction cup can deform to conform to the shape of an object. In this regard, in some embodiments the only actuation is application of vacuum pressure to the suction cup.

In general, the suction cup assembly is configured to conform to and grasp an object upon application of vacuum and (i) to be compliant such that it is conformable to the object upon application of vacuum, (ii) to lift an object after engagement, and (iii) to resiliently return to its rest state upon disengagement with the object. Thus, the resilient ring (in the embodiment of the figures) has the function of providing a structure that connects between the suction cup ring and the sealing membrane, of being resilient to spring bias the suction cup assembly to its rest position (which can be planar) and also sufficiently deformable to enable the foam to conform itself to the object (which can have a wide variety of shapes and sizes) and be strong enough to transmit the load from the suction cup to the membrane. At least the ring can be capable of bending about an axis. In the embodiments of the figures, the ring can deform about any axis, and can be isotropic in this regard (as defined below).

The suction cup in the embodiments shown in the figures can be any material, and preferably is a resilient foam, and has an aspect ratio, durometer, tensile strength, shear strength, and compression set and density to enable it to readily deform with the structural ring in response to the vacuum applied to its interior when in contact with or near an object, to enable it to conform to the shape of the object, to enable it to grip the object, and to enable it transmit the load from the object to the ring during lifting.

The membrane in the embodiments shown in the figures is flexible, preferably along any axis to enable it to readily deform with the structural ring and to enable it to transmit the load of the object from the ring to a connector that is affixes to an end effector (which phrase encompasses various structures and configurations, including indirect coupling).

Thus, the structural ring can be made of a resilient material to supply a spring force to bias the suction cup assembly to the rest position, such that after release of the item and release of the vacuum pressure, the suction cup assembly returns to its rest position. The terms "pliable" and "compliant" as used herein refer the property of being easily elastically deformed. The term "resilient" as used herein refers to the property of being deformable and then, upon release of the deforming force, returning to its undeformed, rest position.

The sealing bellows or membrane may be formed of a pliable material that provides an air seal (which term "seal" encompasses an imperfect sealing material or sealing configuration that merely inhibits air leakage). The connector may be of any type, such as an elastomer or other flexible or inflexible grommet or nipple of any configuration. The suction cup assembly may have isotropic stiffness in the plane defined by the structural ring while the suction cup assembly is in the rest position. In this regard, the stiffness of the suction cup assembly is the same regardless of the axis of bending (in the plane of the suction cup). Preferably, the sealing bellows or sealing membrane is planar.

The structural ring can be formed of a spring steel or a flexible polymer, such as a urethane, an ethyl vinyl acetate (EVA), a polyurethane, a thermoplastic urethane (TPU), moldable or extrudable polymers such as thermoplastic elastomers (TPEs), thermosets such as liquid-injection-molded (LIM) or compression molded silicone or other material, depending on the desired functional aspects of the suction cup, and other parameters, such as diameter, magnitude of vacuum pressure, whether biasing springs are employed, and like parameters, as will be understood by persons familiar with suction cup technology in view of the present disclosure.

The suction cup body can be formed of a pliable material, such as a material comprising an open cell rubber sponge. For example, the suction cup body may include moldable and/or extrudable polymers. The structural ring will typically be stiffer, and in some embodiments have at least twice the stiffness, of the soft, deformable foam.

Figure 14:
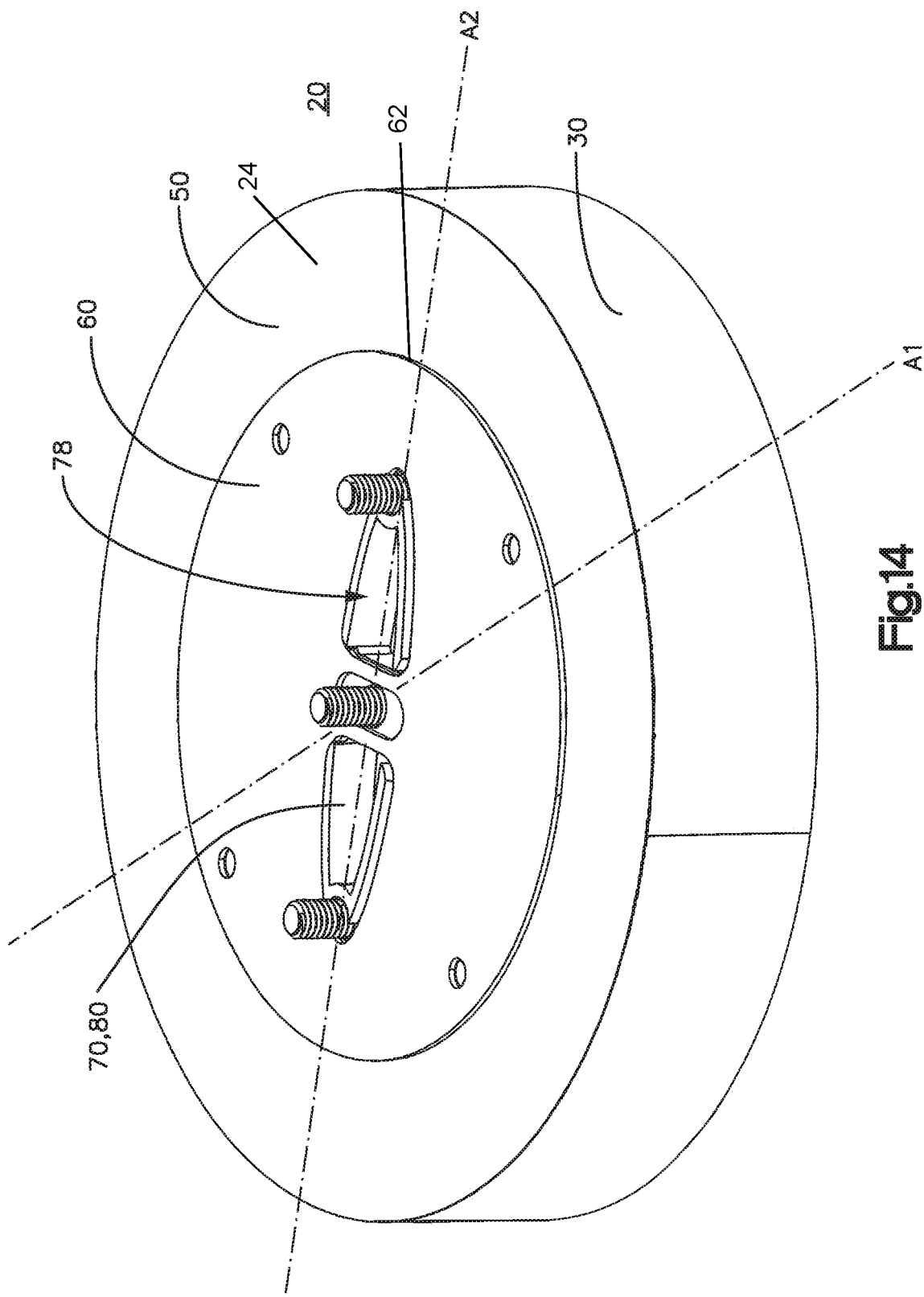
FIG. 14 is a perspective view of a suction cup assembly of a type that may be used with the actuators described herein.
Figure 15:
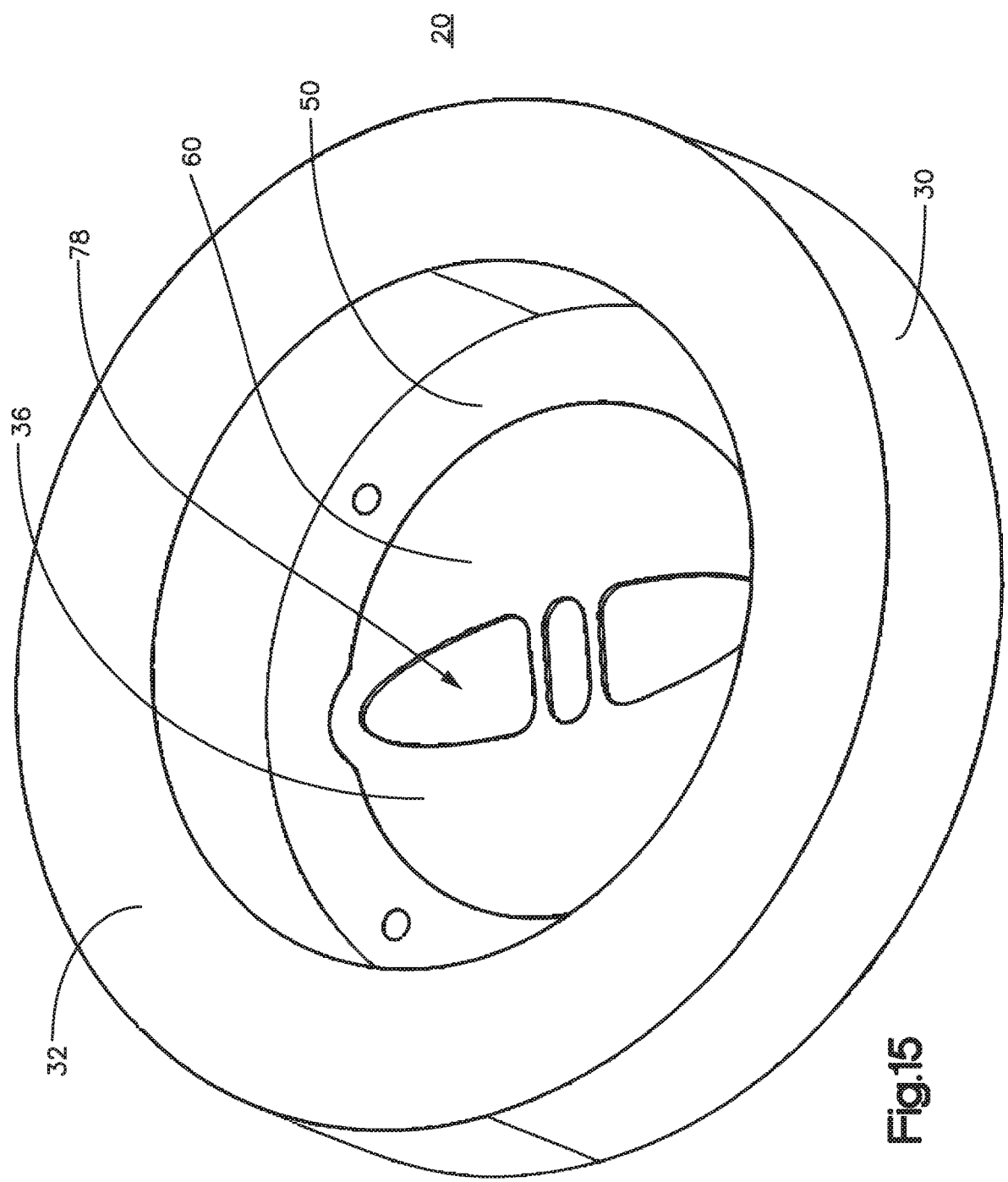
FIG. 15 is perspective, cross-sectional view of an underside of the embodiment of FIG. 14.

FIGS. 14 and 15 are views of an embodiment suction assembly 20 that includes a suction cup body 30, a structural ring 50, a bellows or sealing membrane 60, and a connector fitting 70. Suction cup body 30 forms a chamber 36 within the suction cup, and preferably is an open celled rubber sponge having a density of 0.25. An example of the density the foam that can be used is 300 kg/m^3. The body 30 may also be a hybrid material such as natural latex enhanced urethane foam or block copolymers. The durometer of the foam can range from Shore 25 A to 65 A. Preferably, the compression set at warehouse temperature, 10 C to 35 C, should be less than 20%, such as less than 5%.

The material of suction cup body 30, in many circumstances, may be chosen for its ability to easily conform to an object during the grasping phase and to elastically regain its un-deformed shape after actuation. Thus, many other materials may be used, such as (for non-limiting examples) polymeric foams such as nitrile rubber foam, polyurethane foam, silicone foam, polychloroprene foam (neoprene), and the like. Preferably, the material of suction cup body 30 is easily compressible.

Structural ring 50 may be formed of a thin 316 stainless spring steel. In some examples, the ring 50 may be an annealed 303 SS, and in other examples a urethane having a shore 90 (A) durometer. Ring 50 is attached to a proximal surface 24 of suction cup body 30, such as by an adhesive. Any attachment means may be employed to couple ring 50 and suction cup body 30 together. The term "couple" is used broadly herein to refer to structures being relatively held together, either in direct contact with one other or indirectly by having other components or materials between the structures.

Sealing membrane 60 preferably is a disk formed of an impermeable sheet, film, or fabric that is coupled to and sealed to ring 50 by a ring 62 of pliable, soft transition material. The material of ring 62 may include a wide variety of materials chosen for its function of adhering and sealing membrane 60 and ring 50 together without unduly increasing bending stiffness. For example, an ethyl vinyl acetate (EVA), a polyurethane, and the like may be used. Other non-limiting examples of pliable materials include elastomeric materials such as latex, rubber, and silicone. Any other means for attaching or adhering membrane 60 to ring 50, such as adhesives, mechanical fasteners (including screws, locking rings, clamps, and the like), sewing, melting or welding, and the like, may be employed.

Sealing membrane 60 extends from an inboard rim of ring 50 and includes openings 78 through which vacuum pressure is transmitted. A connector 70 includes an elongate metal fitting 80 that is attached to sealing membrane 60 by screws. Fitting 80 can attach to any corresponding structure of the end effector.

Openings 78 as illustrated in the figures are not radially symmetrical and are sized to fit through aperture 180 in actuator 110. Sheet 60 is formed of a pliable material, such as a fabric, and thus the asymmetrical openings do not materially affect the isotropic stiffness of suction cup assembly 20, apart from the metal connector 70. A Cordura™ nylon of 600 to 1,000 is an example of a product that may be employed to form the sheet of material. Alternatively or in combination, a synthetic leather materials such suede which may have similar properties in all directions may be used. Additionally, materials that have different properties in certain directions, such as elongation, may be used. An example would be 2× greater elongation in the x-axis vs the y-axis.

As illustrated in the drawing of suction cup 20, ring 50 is thin to promote ease of deformation and conformance. The thickness of ring 50 can be chosen according to the particular parameters of the application, such as the magnitude of the vacuum pressure, diameter of the suction cup body, desired stiffness, and the like. A range of 0.0005 inches to 0.002 inches (one half to two thousandths) are examples of a steel ring thickness for a suction cup of two to five inches in diameter. For a polymer ring such as urethane, the range may be 0.010 to 0.150 depending on the mass of the object being captured and manipulated, and other parameters of the particular application.

Figure 16:
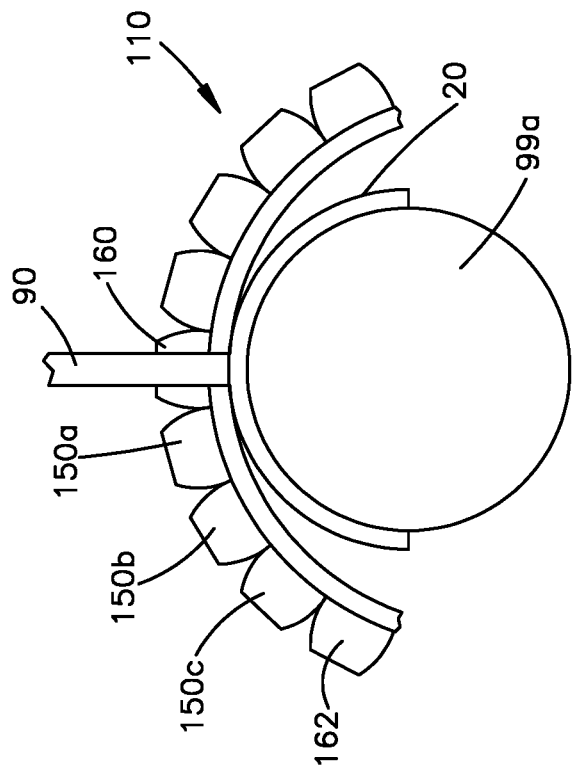
FIG. 16 is a schematic, end view illustration of a gripper engaging a cylindrical object.

FIG. 16 partially schematically illustrates the gripper 10 in an actuated position. Actuator 110 is actuated from the rest, flat position shown in FIG. 3A and suction cup 20 is shown actuated to grasp a cylindrical object 99a, which is shown in end view in FIG. 16. In practice, an arm (such as a gantry arm, a robot arm shown in FIG. 17, or any other mechanism) moves gripper 10 into position relative to an object to be grasped. Pressurized air is applied to actuator 110, causing air chambers 156 to expand the walls into bulges, thereby bending constraining layer 120 into an arcuate shape. Preferably, suction cup 20 is attached to actuator 110 only via fitting 80, and sheet 60 is not attached to constraining layer lower surface 122, and are permitted to move freely relative to one another.

As actuator 110 bends toward its actuated position, distal ends of the actuator contact the corresponding distal portions of suction cup 20 to bend or deflect suction cup 20. The magnitude of vacuum pressure in chamber 36 and the low stiffness of the suction cup assembly (about any axis A1, A2, etc., as illustrated in FIG. 14) induces suction cup assembly 20 to wrap around and conform (by taking or approximately taking the shape) to the cylindrical surface of object 99a. In this regard, the flexibility of suction cup 20 enables the profile of suction cup 20 to form a saddle shape, which in the end view of FIG. 9 is illustrated as a segment of a circular shape. Suction cup body 30 compresses and ring 50 deflects in a continuously varying profile to accommodate the curved cylinder during the engagement process.

Figure 18:
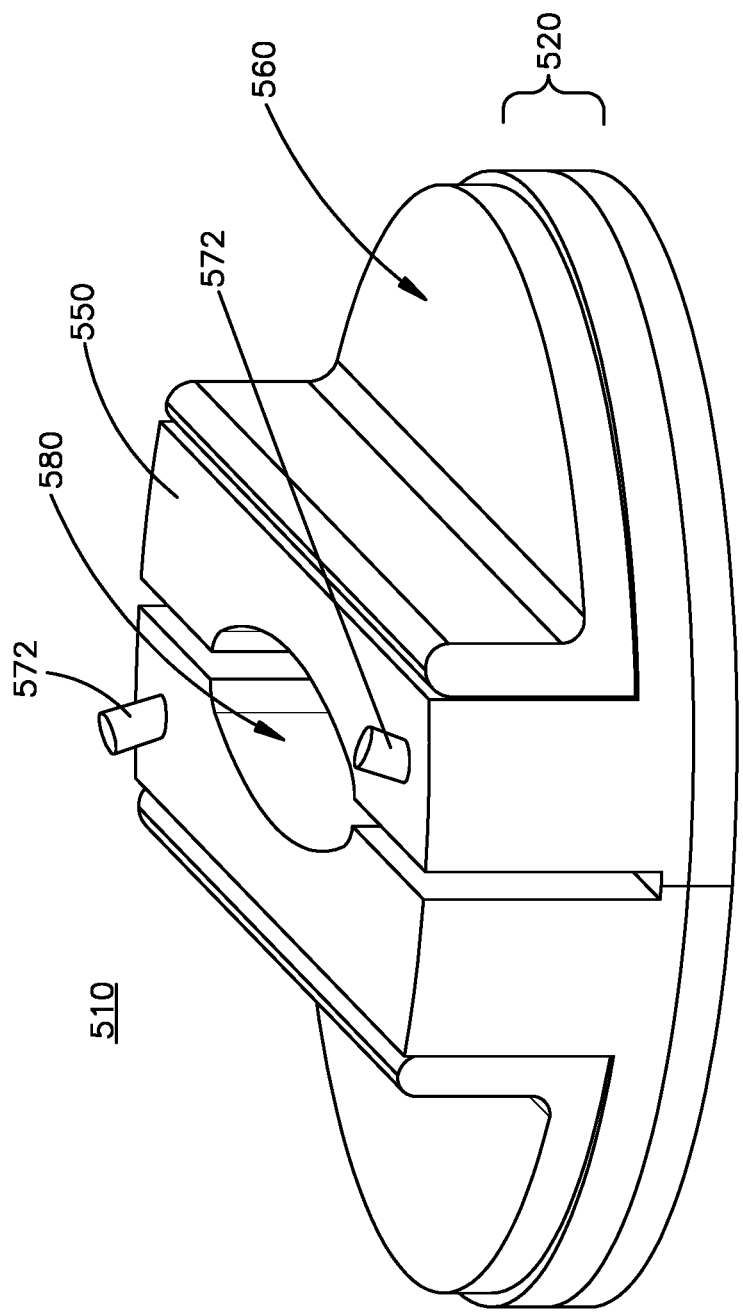
FIG. 18 is a perspective view of another embodiment of an actuator in a neutral position.
Figure 19:
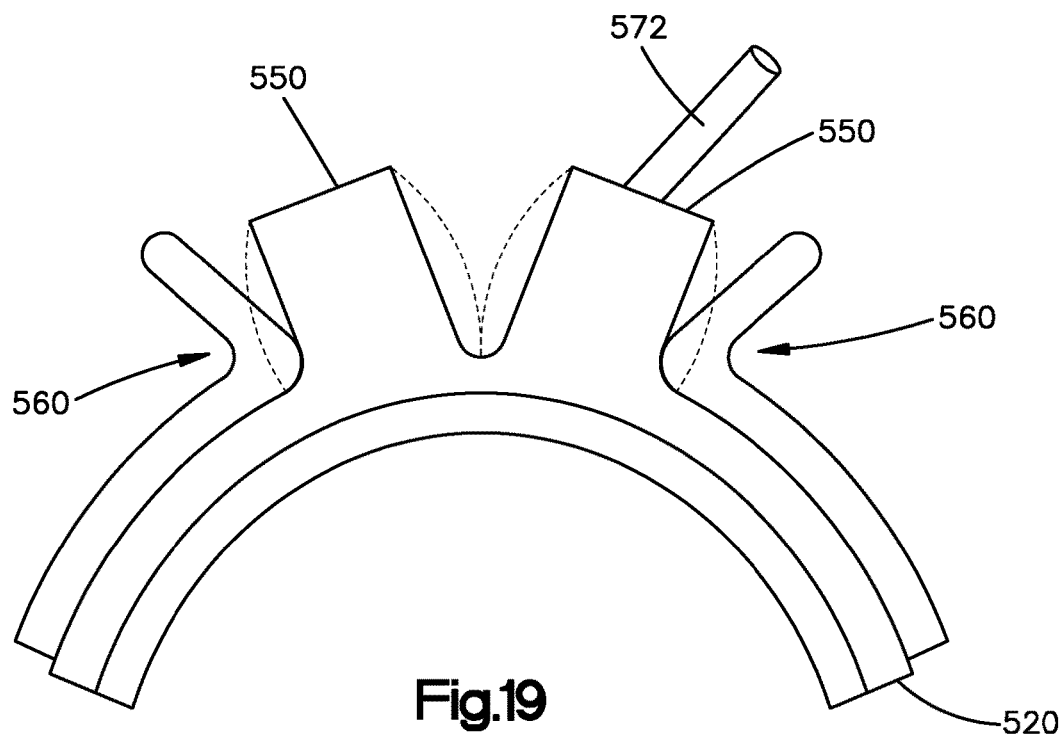
FIG. 19 is a perspective view of the actuator of FIG. 18 in an example of an actuated position.
Figure 20:
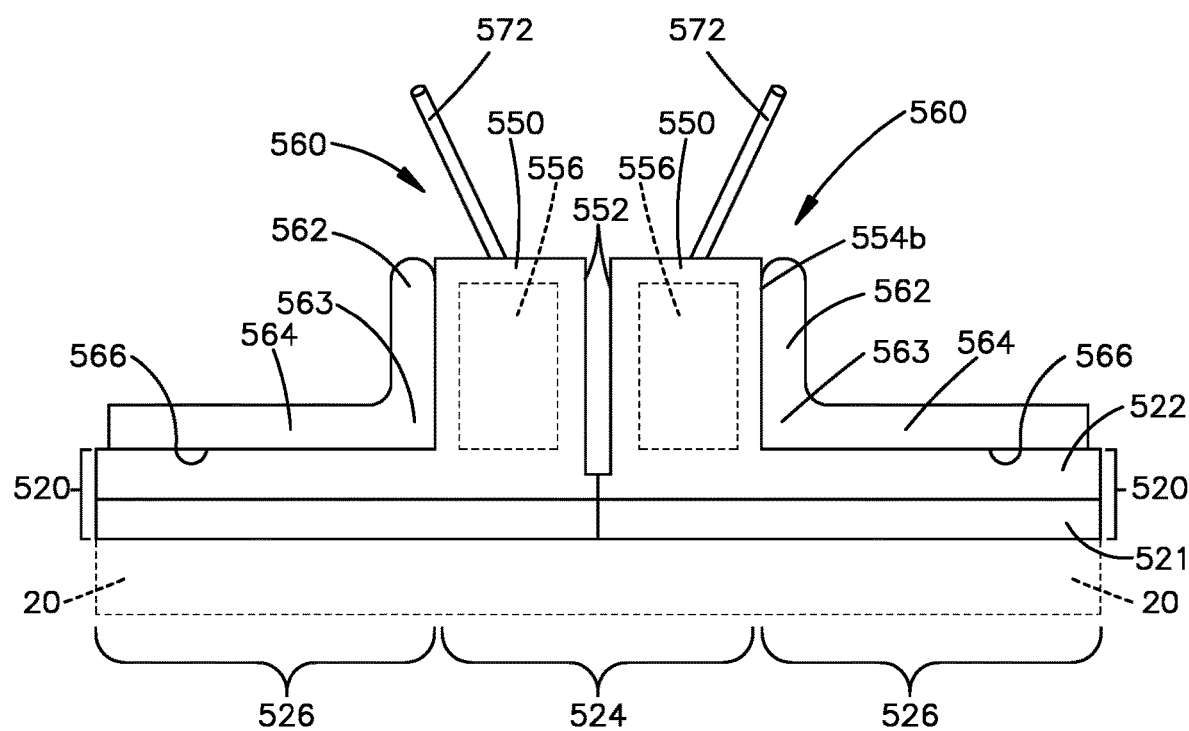
FIG. 20 is a side view of the actuator of FIG. 18.

According to another embodiment, as illustrated in FIGS. 18-20, an actuator 510 includes a base layer 520, air bladder assemblies 550, and opposing flange structures 560. In the embodiment of the figures, actuator 510 is circular for illustration. Other shapes may be employed according to the parameters of the desired application of the actuator, as explained more fully below.

Base layer 520 (as illustrated in the figures) is a flat, flexible, circular disc. Base layer 520 can include a lower layer 521 and an upper layer 522, which preferably are integral. A pair of air bladder assemblies are located on opposing sides of an aperture 580 formed in the center of the actuator. Aperture 580 is oval and can receive a fitting 80 (described above) or like fixture to attach aperture 580 to end effector 10.

Base layer 520 includes a central portion 524 and a pair of opposing ears 526 outboard of each central portion 524. Central portion 524 is formed beneath air bladder assemblies 550 and may perform a constraining function to enhance the deformation from the moments created by the air bladder forces. Ears extend outwardly from central portion 524. As the illustrated embodiment 510 is circular, central portion 524 extends a diameter of the actuator and ears 526 form segments of a circle.

FIG. 20 is a side view of actuator 510 with portions of air bladders 550 shown in relief. Each air bladder 550 includes an elongate inboard sidewall 552, an elongate outboard sidewall 554, and an air chamber 556 defined between sidewalls 552 and 554. The air chambers 556 are oriented along chords of a circle defined by base layer 520 on opposing sides of aperture 580. Preferably, outboard walls are straight (that is, chordal) and inboard walls have a curved portion to match opening 580.

Air bladders 550 can take the shape generally described and shown for third embodiment air bladder 350a, as best illustrated in FIG. 13. In this regard, air chamber 556 narrows along a side of opening 580 and opens on each end to enlarge the air chambers. The specific dimensions of the air chambers and wall thicknesses may be chosen according to the particular desires of the application, as will be understood by persons familiar with air actuated apparatus.

One or more air inlets 572 extend through the wall of the air bladder assemblies to supply compressed air or like fluid to the air chambers 556, and optionally to release compressed air from the air chambers. One or more plenums (not shown in the figures) can connect air chambers 556 together.

Each flange structure 560 includes a flange wall 562 and a flange plate 564 that are joined together at a flange junction 563. Flange structure 560, in the illustrated embodiment, is formed of a rigid polymer. Flange structure 560 can be attached to the outer walls 554 of the air bladder assemblies and/or an upper surface of base layer 520 by any means, such as by an adhesive, and at any location. It is not required the flange structure 560 be attached to either outer walls 554 of the air bladder assemblies and/or an upper surface of base layer 520, as other configurations are contemplated.

For example, flange plate 564 may be adhered to an upper surface of base layer 520 across its entire surface. Alternatively, flange structure 560 may be attached to outer walls 554 of the air bladder assemblies and/or an upper surface of base layer 520 near the junction 563, such that flange plate 564 is not attached to the upper side of ears 526 where spaced apart from junction 563, and flange wall 562 is not attached to air bladder outer wall 554 where spaced apart from junction 563, to enable or enhance sliding movement of walls 554 and/or base 520 relative to flange plate 564 and flange wall 562 during actuation. Also, a rigid flange plate may be adhered or applied to an underside of base layer 520 in the region of ears 526.

FIG. 20 illustrates actuator 510 in the neutral position and in a position in which actuator 510 is positioned such that base layer 520 is horizontal. In this view, flange walls 562 are vertical or approximately vertical. In the neutral position, flange plate 564 is approximately parallel to base layer. Flange wall 562 is angled relative to the flange plate 564 in the embodiment shown, and can be orthogonal. As illustrated, flange plate 564 is planar and ears 526 are planar. Other configurations of the rigid structure and air bladders are contemplated. For example, the unpressurized position of the base layer and/or flange structure may be a downward V-shape such of the actuator forms an included angle of less than 180 degrees, Or the unpressurized position of the actuator can be an upward V-shape such that the actuator forms an included angle of greater than 180 degrees to retract the ears.

As illustrated schematically in FIG. 20, a suction cup 20 may be attached to an underside of the actuator 510 for forming a gripper assembly. Suction cup 20 may be as described above or have other configuration. Alternatively, a non-slip layer or coating may be applied to the underside of base layer 520, such as when actuator 510 is employed to directly engage an item to be lifted. The term "grasping element" is used herein to refer to a suction cup, a non-slip layer, ingressive elements, magnetic elements, and adhesive elements adapted for grasping the item.

In use, actuator 510 can start at its neutral position, shown in FIG. 18-20, in which the air bladders 550 are not pressurized and base layer 520 is planar. Upon positioning actuator 510 to a desired position relative to an item to be grasped, air pressure can be supplied to air chambers 550 via air inlet 572. Air pressure within air chambers 550 expands walls 552 and 554 outward.

For the embodiment of the figures, upon application of air pressure in chambers 556, sidewalls 552 and 554 deform outwardly. Inboard sidewalls 552 press on each other at ends of the air bladders to create an outward-directed force. Proximal or radially inboard portions of sidewalls 552 may press on fitting 80 (not shown in FIGS. 18 and 19) also to create an outward-directed force. Outboard walls 554 press on an inboard side of flange wall 562.

The central portion 524 of the base layer 520 can constrain outward movement in response to the forces applied by the walls against each other, fixture 80, and flange wall 562. Further, the forces applied to wall 562 by the air bladders can create a moment approximately about junction 563 or other location, depending on the particular configuration of the components. The forces created by the air bladder expansion create moments that moves outboard portions of flange plates downwardly and inwardly against ears 526 of base layer 520 while base layer 520 deforms or flexes, as best illustrated in FIG. 19. In some embodiments, the outermost edges of ears 526 remain substantially flat, as distinguished from bending inwardly as occurs in some configurations.

In embodiments in which a suction cup 20 is employed, suction cup 20 flexes in response to forces applied by base layer 520 to engage an item. The engagement of suction cup 20 with the item can be enhanced by the vacuum pressure applied to the interior or suction cup 20, as described more fully herein. Alternatively, another grasping element, such as a non-slip layer on the underside of base layer 520, can engage the item to be grasped.

In embodiments in which flange plates 564 are not affixed to the upper portion of ears 526, and the underside of ears 526 are not affixed to suction cup 20, the forces applied by the air bladders 550 are transmitted via flange plates 564 to base layer 520, and via base layer 520 to suction cup 20, by sliding contact.

Upon release of air pressure within air chambers 556, base layer 520 returns to its neutral position shown in FIG. 20 at least in part because of the resilient material that base layer 520 of formed of Other means for returning actuator 510 to its neutral position are contemplated.

To form actuator 510, air bladder assemblies 550 can be molded or formed by other method of a pliable and resilient material, such as a hyper-elastic material. Other, elastomeric materials such as latex, rubber, and silicone may be used. Other materials are contemplated. Base layer 520, including layers 521 and 522, may be formed of the same or other material as that of the bladder assemblies 550. The two parts can be joined together by an adhesive or other known means for joining the particular materials chosen.

The choice of material, shape of the base layer 520, shape and dimensions of the air bladder assembly overall, dimensions and locations of the air chamber, dimension and locations of the walls opposing the air bladder, and other parameters may be chosen together in order to achieve the desired functional properties of the air bladder, such as magnitude of deflection, location of bending axis, shape of base layer upon deflection, and the like, upon pressurization.

The actuator 510 is described herein as having a circular shape, especially at base layer 520. The present invention is not limited to actuators having any shape. For example, an actuator and/or grasping element having a square, rectangular, oval, or polygonal shape may be employed, as various shapes may have advantages depending on the particular application, such as the configurations of the items to be lifted, weight of the items, and like parameters. Further, the air bladders are described as elongate and are shown in the figures to be straight. The present invention is not limited to straight air bladders or elongate air bladders unless specified in the claims. Further, the air bladders are illustrated as having a rectilinear cross-sectional shape. The actuator is not limited to the rectilinear air bladder configuration, but rather encompasses of air bladders having any shape, such as triangles, inverted triangles, arcuate curves and like cross-sectional shapes. Moreover, FIGS. 18-20 illustrate only a pair of air bladders 550, and the present invention encompasses any number of air bladders in any configuration.

An approximately right-angle relationship between flange wall 562 and flange plate 564 is illustrated in the figures. The present invention is not limited to the relationship or configuration of the flange structure in relation to the air bladders and other configurations of the actuator shown in the figures, but rather broadly encompasses any rigid structure consistent with the structure and/or function set out in the claims.

For example, the following parameters may be chosen to yield the desired shape of the actuator (such as the base layer underside surface and the force and/or bending moment imparted by the air bladders and flange structure, and other desired attributes of the actuator) in the actuated position: the number and location of the air bladders, wall thickness of the opposing walls of the air bladders, dimension of the slots (that is, between adjacent walls), whether air bladders are side-by-side or separated by non-expanding solid portions, modulus of elasticity of the material, moment of inertia of the structure or other mechanical property associated with resistance to deformation, air pressure, thickness of the base layer, dimensions and configuration of the flange structure or other rigid structure employed to enhance the function of the actuator, and other parameters that will be understood by persons familiar with air actuated grippers in view of the present disclosure.

In some embodiments, a control system is provided for the functional aspects of the gripper 10. The control system may receive data from one or more sensors (for example, optical, contact, proximity, etc.) disposed on and/or around the end effector/gripper 10. This data will be used by the control system to determine surface shapes of the item and objects near the item. Alternatively, or additionally, the control system may receive data from a database of known item types. For example, data of known item types may describe the item using two or higher dimensional images and/or modes of the item, attributes of the item (e.g., dimensions, weights, center of gravity, etc.), and/or features associated with surfaces of the item (e.g., a surface label, surface or material characteristics, etc.). A two dimensional image of the item showing a feature may allow an identification of a respective surface. If the two dimensional image (or a plurality thereof) shows multiple features, relative distances, positions, and orientations of these features may be determined. Generated two dimensional images of an item may be mapped to a multi-dimensional model that enables the control system to determine the relative position and orientation of the item in three-dimensional space. Alternatively, or additionally, the control system may receive data from one or more sensors (for example, optical, contact, proximity, etc.) in a scan tunnel disposed upstream of the end effector.

Alternatively, or additionally, the control system may receive data indicating grasping strategies that have been successful or unsuccessful for the same or similar items and/or item configurations in the past. Success data may be based on a specific end effector and/or a specific type of end effector and/or data related to the position and orientation of the end effector in relation to the items and item configurations. For example, the control system for the end effector may receive success data from the end effector itself, as well as other end effectors with the same or similar design. The known item data may also describe the applied manipulations (e.g., a list of the actions including grasping, moving, retrieving, etc.), related manipulation parameters (e.g., type and amount of force, pressure, voltage, and/or current applied, orientation of an item, etc.), and successes and failures of the applied manipulations (e.g., whether grasping an item was successful, damages resulting from using particular manipulations, end effectors, or forces, etc.).

Control may also be via mechanical analog control where when vacuum is achieved. For example, when the cup captures the target object, the vacuum pressure at the end of arm tool increases rapidly. An analog mechanical vacuum valve may be employed to respond to the change in vacuum and freeze the shape of the suction cup once capture is achieved. Alternately the change in pressure at capture can be used to freeze motor motion once capture is achieved.

Alternately, if electric motors are used, the current into the motor will also indicate when capture is achieved. In embodiments having a suction cup, the cup wraps around the captured object, further deformation of the cup is only possible by rapidly increasing the force applied by the motors. More force will not increase the capture, but may damage the cup and the captured article to be manipulated. When both vacuum is achieved and the force (current into the motors) begins to increase, the motors can be configured freeze to prevent damage to the captured target article.

The control system may receive input from a human and/or from one or more sensors regarding which, of two successful grasping strategies, is a better grasp. The control system may employ other data inputs, as well. The control system may employ machine learning on the received data to determine an initial grasping strategy. If unsuccessful, the control system may provide a second grasping strategy based, at least in part, on the data that the initial grasping strategy was unsuccessful. Once a successful grasping strategy is determined, the control system will save to the database data related to the successful strategy for future use by the specific end effector and other end effectors grasping the same or similarly shaped items.

In some embodiments, the robotic manipulation system is able to employ other end effectors having different structural profiles if the first grasping strategy using the first end effector is unsuccessful. The control system can receive success data regarding multiple end effectors, including input from a human and/or from one or more sensors (for example, optical, contact, proximity, etc.) regarding which, of two successful grasping strategies, is a better grasp. The control system will save to the database data related to strategies for grasping when multiple end effectors are available for future use by the specific end effector and other end effectors grasping the same or similarly shaped items.

Data used and gathered by the control system may be exchanged over one or more networks. The networks may include a public data network (e.g., the Internet) and a private data network (e.g., an intranet or a virtual private network (VPN)), wireless or wired, and implementing different communication protocols (e.g., TCP/IP). The network may connect to the specific robotic arm on which the end effector is disposed, as well as other robotic arms.

The end effector structure and function are described herein by referring to advantages and specific examples or embodiments. The present invention is not limited to the advantages explained herein, nor to the structure or function of the examples or embodiments. Moreover, the text is intended to describe the specific embodiments shown in the figures. The structure and function shown and described is intended only for example. For non-limiting examples, the quantity and shape of air bladders and corresponding wall thicknesses and heights, the parallel orientation of the bladders, symmetry about an axis, circular profile of the actuator, and like parameters are provided merely for illustration, and are not intended to be limiting unless explicitly stated in the claims. And the function descriptions are not intended to limit the scope of the invention. Rather, it is intended that the invention be given the full scope of the plain meaning of the claims.

What is claimed is:

1. An actuator for a gripper on a robotic end of arm tool, the actuator comprising:
    a base layer having a neutral position and an actuated position;
    a pair of opposing flange structures, each flange structure including an elongate flange wall and a flange plate rigidly attached to the flange wall;
    a compliant air bladder assembly including elongate air bladders located above the base layer; the air bladder assembly being configured to expand, upon pressurization, to apply opposing bending moments to the flange structure, the base layer being adapted for bending in response to the bending moments, thereby bending the base layer toward the actuated position.

2. The actuator of claim 1 wherein the air bladder assembly is located between the opposing flange walls and is configured to apply the moments to the flange structure via outwardly oriented forces on the flange walls, and wherein the flange plate extends over the base layer such that the moment applied from the air bladders to the flange wall is transmitted to the base layer via the flange plate.

3. The actuator of claim 2 wherein the flange plate is attached to the base layer in a region spaced apart from the flange wall.

4. The actuator of claim 3 wherein the flange wall is angled relative to the flange plate.

5. The actuator of claim 4 wherein the base layer includes an air bladder region and a pair of ears extending outwardly from the bladder region.

6. The actuator of claim 5 wherein, when the actuator is in the neutral position, the flange plate is planar, the ears of the base layer are planar, the flange plate is approximately parallel to the ears, and the flange wall is approximately vertical.

7. The actuator of claim 6 wherein the air bladders include inboard air bladders and a pair of outboard air bladders, walls of the inboard air bladders upon expansion contact bladder walls of adjacent air bladders, and wherein an outboard wall of each one of the outboard air bladders contacts the corresponding one of the flange walls.

8. The actuator of claim 2 wherein, in the neutral position, an underside surface of the base layer is a circle when the actuator is in the neutral position.

9. The actuator of claim 8 wherein the flange walls are approximately parallel in the neutral position and are oriented along chords of the circle; and wherein each one of the flange plates form a minor segment of a circle.

10. The actuator of claim 8 wherein each air bladder includes an air chamber and the air bladder assembly includes at least one plenum adapted for communicating between the air chambers, and the air bladders are separated by chordal slots.

11. The actuator of claim 10 the actuator includes a center aperture adapted for retention to an end of arm tool by a fitting.

12. A robotic end of arm tool gripper for grasping an item, the gripper comprising:
    an actuator including:
        a base layer having a neutral position and an actuated position;
        a pair of opposing flange structures, each flange structure including an elongate flange wall and a flange plate rigidly attached to the flange wall;
        a compliant air bladder assembly including elongate air bladders located above the base layer and between the opposing flange walls; the air bladder assembly being configured to expand, upon pressurization, to apply opposing moments on the flange structure to deform the base layer toward the actuated position; and a grasping element at an underside of the base layer, the grasping element adapted for contacting an item to be lifted.

13. The gripper of claim 12 wherein the grasping element is a suction cup assembly defining an aperture and configured to be at least initially moved from a neutral position by movement of the actuator, and to conform to and grasp an object upon application of vacuum to the suction cup assembly.

14. The gripper of claim 13 wherein ears of the base layer are not affixed to the suction cup assembly, and the suction cup assembly is adapted to resiliently return to its neutral position upon release of the vacuum to the suction cup assembly independent of resilience of the actuator.

15. The gripper of claim 14 wherein the suction cup assembly comprises:
   a flat, resilient ring;
   a foam cup attached to the ring; and
   a planar, flexible membrane attached to the ring and extending radially inwardly from the ring; and
   wherein the suction cup assembly is configured to resiliently return to its neutral state upon disengagement with the object.

16. A method of grasping an object using a gripper comprising the step of:
   positioning the gripper of claim 14 relative to an item;
   pressurizing air bladders of the actuator such that the airbladders apply bending moments to the flange structures;
   deforming the grasping element in response bending moments transmitted through the flange structures; and
   grasping the item via engagement of the grasping element with the item.

17. The method of claim 16 wherein deforming step includes deforming a suction cup grasping element and the grasping step includes applying vacuum to an interior of the suction cup.

18. The method of claim 17 further comprising the steps of:
   lifting the object after the pressurizing and applying steps; and
   releasing the pressure in the air bladders and releasing vacuum in the suction cup assembly, thereby (i) releasing the object and (ii) enabling the actuator to resiliently return to the neutral position and enabling the suction cup assembly to resiliently return to the neutral position independently from the resilient return of the actuator to the neutral position.

19. The gripper of claim 12 wherein the grasping element includes one of a non-slip surface, ingressive elements, magnetic elements, and adhesive elements adapted for grasping the item.

20. The gripper of claim 12 wherein each one of the actuator and the grasping element include a center aperture through which a fitting can extend to join the gripper to an end of arm tool.

* * * * *